UNITED STATES PATENT OFFICE.

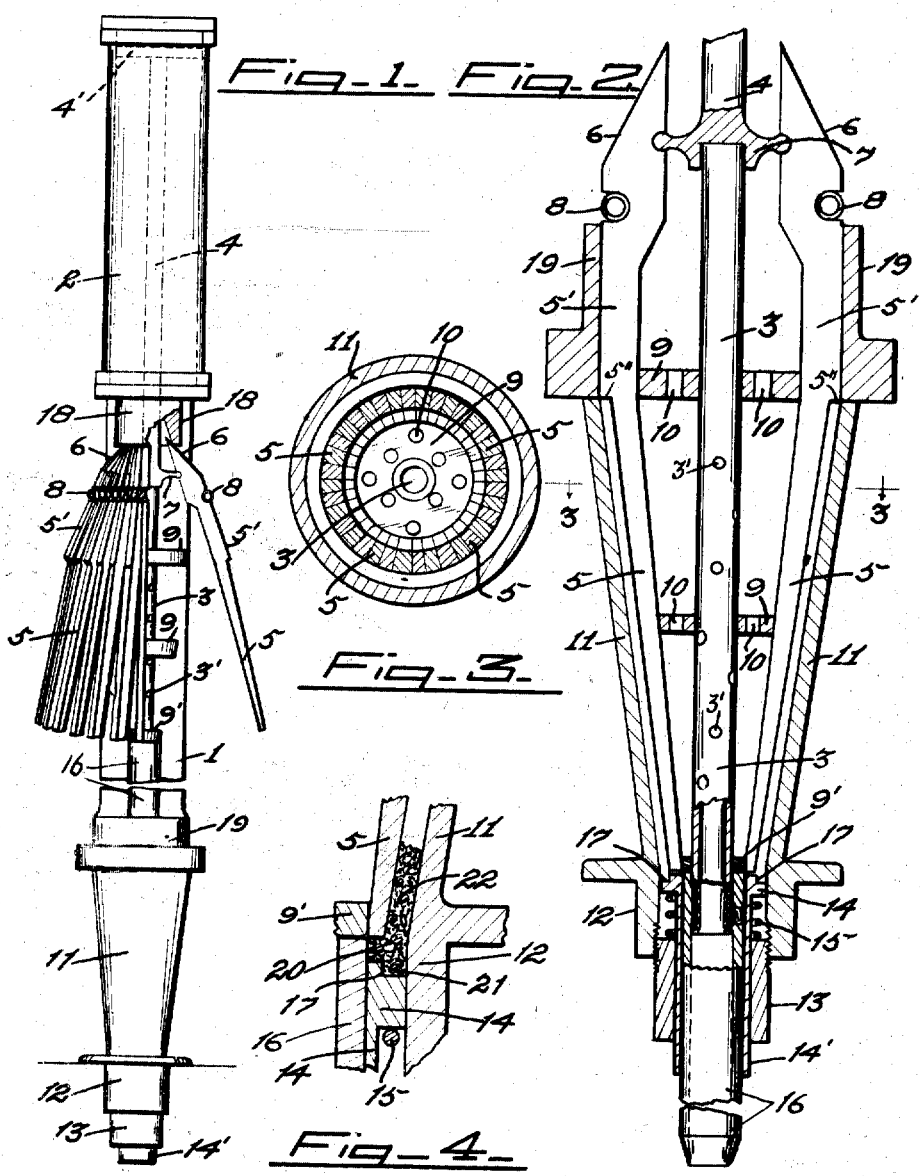

JACKSON B. YOUNG, OF OAKLAND, CALIFORNIA.

MACHINE FOR MAKING HOLLOW WARE FROM PULP.

1,244,820.  Specification of Letters Patent.  Patented Oct. 30, 1917.

Application filed November 16, 1916. Serial No. 131,763.

*To all whom it may concern:*

Be it known that I, JACKSON B. YOUNG, a citizen of the United States, residing at Oakland, in the county of Alameda and State of California, have invented certain new and useful Improvements in Machines for Making Hollow Ware from Pulp, of which the following is a specification.

My invention relates to the class of machines for making hollow-ware of moldable material particularly of papier-mâché or similar pulp.

The object of the invention is to provide a machine of simple construction and operation adapted for the manufacture of articles from pulp, especially conical shapes suitable for various uses, but especially for milk-bottles.

To this end my invention consists in the novel machine which I shall now fully describe, by reference to the accompanying drawings, in which—

Figure 1 is an elevation, broken, of the machine, showing the inner mold lifted from the outer mold, and its fingers spread for cleansing effect, some of the fingers being omitted for the sake of clearness.

Fig. 2 is a vertical section, enlarged, of the outer mold and the yielding end-abutment, and showing the inner mold in place.

Fig. 3 is a section on the line 3—3 of Fig. 2.

Fig. 4 is a detail section, enlarged, of one side of the adjacent coacting surfaces of the molds and abutment at the lower end, showing their effect in making the neck of the article.

In Fig. 1, the frame 1 is surmounted by a pressure cylinder 2 which may stand for and indicate any suitable means for carrying and operating the inner mold. This is effected through the tubular axis-rod 3 of the inner mold, said rod or an extension 4 thereof passing up into the cylinder as shown by the dotted lines and having a piston 4' on its upper end. I have not deemed it necessary to show herein the fluid pressure connections of the cylinder as these form no part of my invention, the illustration being ample to indicate the essential fact of the reciprocative movement of the inner mold. The said inner mold is composed of independent fingers 5, suitably beveled to present when lying together in circumferential series the tapering shape of an inverted truncated cone. The heads 5' of these fingers are straight, that is non-tapering, and they meet the tapered portions on a shoulder 5''. The upper ends of the heads 5' are beveled at 6. The fingers are connected with the axis-rod 3 by a collar 7 on said rod. On this collar the heads 5' of the fingers freely fulcrum for swinging movement, and they are encircled by a spring 8, the tendency of which is to hold the fingers 5 in taper-mold shape.

9 are supports carried by the axis-rod 3, and against which the fingers bear when together, as seen in Fig. 2. The lowermost support 9' is imperforate and serves as a closure for the inner-mold end, but the other supports are perforated, as shown at 10, for drainage of the excluded water surplus from the material, into the hollow rod 3 through holes 3' in said rod.

11 is the outer mold. This is carried by the lower end of the frame 1 and has the tapering shape of an inverted truncated cone, corresponding to the functional shape of the inner mold. The foot 12 of the outer mold is cylindrical and has fitted to it a foot sleeve 13. Fitted to and slidable within the cylindrical foot 12 of the outer mold is the annular yielding end-abutment 14, forming the bottom closure for the mold space. It is supported by a spring 15 bearing between the head of the abutment and the foot sleeve 13. The guide stem 14' of the abutment passes down through the sleeve and said stem is adapted to be closed by the plug-extension 16 of the axis rod 3 of the inner mold, as will be presently described. The upper face of the yielding end-abutment 14 is formed with a rabbet 17 about its edge. Under the base of the cylinder 2 is a fixed contact sleeve 18 for spreading the fingers of the inner mold. On top of the outer mold is the cylindrical extension 19 which coacts with the straight-head portions 5' of the inner mold fingers to impose a direct downward pressure on top of the material.

The operation of the machine is as follows:—When the parts are in the position shown in Fig. 1, the inner mold fingers, by contact with the sleeve 18 have been spread in order to clear them of any particles of adhering material if such cling to them. The inner mold is now lowered, and immediately, by breaking the contact with the sleeve 18, the fingers 5 are closed together by the spring 8 to functional taper shape. When the mold has descended a distance sufficient to cause the plug extension 16 of the axis rod 3 to enter and close the stem 14' of the annular end-abutment 14, and before the fingers 5 reach the extension 19 of the outer mold, the pulp is poured into the top of said extension 19, until it fills the outer mold and said extension. Then the inner mold descends into the extension 19 and outer mold 11. Until the shoulder 5'' of the inner-mold head reaches the top of the extension 19, the fluidic contents displaced by the entering mold, overflows, if sufficient volume be present, the top of said extension. The holding capacity of the outer mold 11 and head extension 19 and the displacement of the inner mold are so proportioned that when the shoulder 5'' of the inner mold head reaches the top of the extension 19, there will remain in the outer mold just enough pulp to make the product intended. The lower end of the inner mold being closed by the imperforate bottom support 9', said mold will, as it continues down, force the pulp to fill the space between the two molds, all the way up to the descending shoulder 5''. As the descent continues, the mold space gradually grows thinner and shapes the product, the shoulder 5'' pressing down upon and condensing the upper end of the product, and the end-abutment 14 below, shaping and condensing its other end. The whole pressure is complete when the head-shoulder 5'' reaches the top of the tapered outer mold. The surplus water during this operation is squeezed inwardly between the mold-fingers 5 and drains out through the perforated axis rod 3 and its open ended hollow plug extension 16.

In the operation, the end-abutment 14 yields downward sufficiently to cause the pulp to be pressed inwardly under the lower end of the mold fingers and also to follow down in the straight foot 12 of the outer mold, thereby forming, as shown in Fig. 4, a neck for the molded product 22, which neck comprises an inner flange 20 and a cylindrical extension 21.

It must be explained that the article thus formed is upside down for its use as a milk-bottle, and, therefore, the end last described forms an efficient neck, in which upon the flange 20 a cover may be laid. The other or larger end of the article is of course open when taken from the machine, and must have its bottom applied in some manner with which I am not herein concerned. When the molding is complete, the inner mold is lifted out, and when the beveled extremities 6 of its finger heads, reach the fixed contact sleeve 18, the fingers 5 are separately but in unison thrown outwardly as shown in Fig. 1, which movement effectually clears them of any material which may cling to them.

If now, as is intended, the machine or the outer mold structure only be turned upside down as it would be if it were a unit of a revolving system, the molded product will drop out by gravity; or if it be inclined to stick, the spring abutment will release and positively discharge it. I have found, in practice, that the inner mold formed as described of a multiplicity of swinging fingers will not only act as a sieve to permit the passage of the excluded water but will also act to admit air to break the more or less intimate suction contact of the fingers and molded product, so that the mold may be easily withdrawn.

Very little, if any, particles of the material cling to the fingers when withdrawn, but if such be present, the spreading of the fingers serves to detach them, so that the inner mold is always clean, a factor of importance in this work.

I claim:—

1. A machine for the described purpose comprising a tapered outer mold; and a tapered inner mold movable into and out of the outer mold, and formed of a circumferential series of swinging fingers.

2. A machine for the described purpose comprising a tapered outer mold; a tapered inner mold movable into and out of the outer mold, and composed of a circumferential series of swinging fingers; and means for spreading the fingers when withdrawn from the outer mold.

3. A machine for the described purpose comprising a tapered outer mold; a tapered inner mold movable into and out of the outer mold and composed of a circumferential series of swinging fingers; and resilient means for pressing the fingers together to taper-mold shape.

4. A machine for the described purpose comprising a tapered outer mold; a tapered inner mold movable into and out of the outer mold and composed of a circumferential series of swinging fingers; resilient means for pressing the fingers together to taper-mold shape; and means acting on the fingers when withdrawn from the outer mold to spread them apart.

5. A machine for the described purpose comprising a tapered outer mold; a tapered inner mold movable into and out of the outer mold and composed of a circumferential series of swinging fingers; a drain rod in the axis of said inner mold; a connection between said rod and the fingers of said mold, upon which connection said fingers are individually fulcrumed; and a spring encircling the fingers to press them together to taper-mold shape.

6. A machine for the described purpose comprising a tapered outer mold; a tapered inner mold movable into and out of the outer mold and composed of a circumferential series of swinging fingers; a drain rod in the axis of said inner mold; a connection between said rod and fingers of said mold, upon which said connection said fingers are individually fulcrumed; a spring encircling the fingers to press them together to taper-mold shape; and means acting on the fingers to spread them apart when withdrawn from the outer mold.

7. A machine for the described purpose comprising a tapered outer mold; a tapered inner mold movable into and out of the outer mold and composed of a circumferential series of swinging fingers; a hollow, open-ended rod with perforated walls, in the axis of the inner mold; a collar on the rod with which said fingers are pivotally connected; a spring encircling the fingers to press them together to taper-mold shape; and a fixed contact member acting on the upper ends of the fingers to spread them apart when withdrawn from the outer mold.

8. A machine for the described purpose comprising a tapered outer mold; a tapered inner mold movable into and out of the outer mold and composed of a circumferential series of swinging fingers, said fingers having shouldered straight head portions; and a cylindrical head-extension of the outer mold coacting with the shouldered straight head portions of the inner mold fingers to impose pressure on top of the material being molded.

9. A machine for the described purpose comprising a tapered outer mold; a tapered inner mold movable into and out of the outer mold and composed of a circumferential series of swinging fingers, said fingers having shouldered straight head portions; a spring encircling the fingers to hold them together to taper-mold shape; and a cylindrical head-extension of the outer mold coacting with the shouldered head portions of the inner mold fingers to impose pressure on top of the material being molded.

10. A machine for the described purpose comprising a tapered outer mold; a tapered inner mold movable into and out of the outer mold and composed of a circumferential series of swinging fingers, said fingers having shouldered straight head portions; a spring encircling the fingers to hold them together to taper-mold shape; a cylindrical head-extension of the outer mold coacting with the shouldered head portions of the inner mold fingers to impose pressure on top of the material being molded; and means acting on the fingers to spread them apart when withdrawn from the outer mold.

11. A machine for the described purpose comprising a tapered outer mold; a tapered inner mold movable into the outer mold to compress the material in the intervening mold space; and a yieldable abutment closing the foot of the mold space.

12. A machine for the described purpose comprising a tapered outer mold having a cylindrical foot; an inner mold movable into the outer mold to compress the material in the intervening mold-space; and a yieldable abutment fitted in the cylindrical foot of the outer mold and closing the mold space.

13. A machine for the described purpose comprising a tapered outer mold having a cylindrical foot; an inner mold movable into the outer mold to compress the material in the intervening mold-space; and a yieldable abutment fitted in the cylindrical foot of the outer mold and closing the mold space, said abutment having a rabbet around the outer edge of its inner face.

14. A machine for the described purpose comprising a tapered outer mold having a cylindrical foot; a spring-controlled sliding abutment seated in said foot and closing the mold-space; and a tapered inner mold movable into the outer mold to compress the material, said inner mold being composed of a circumferential series of swinging fingers.

15. A machine for the described purpose comprising a tapered outer mold having a cylindrical foot; a spring-controlled sliding abutment seated in said foot and closing the mold-space; a tapered inner mold movable into the outer mold to compress the material, said inner mold being composed of a circumferential series of swinging fingers, and means for resiliently holding said fingers together in taper-mold shape.

16. A machine for the described purpose comprising a tapered outer mold having a cylindrical foot; a spring-controlled sliding abutment seated in said foot and closing the mold-space; a tapered inner mold movable into the outer mold to compress the material, said inner mold being composed of a circumferential series of swinging fingers, means for resiliently holding said fingers together in taper-mold shape, and means acting on the fingers to spread them apart when withdrawn from the outer mold.

17. A machine for the described purpose comprising a tapered outer mold having a cylindrical foot; a spring-controlled sliding abutment seated in said foot and closing the mold-space; said abutment having a rabbet around the outer edge of its inner face; and a tapered inner mold movable into the outer mold to compress the material, said inner mold being composed of a circumferential series of swinging fingers.

18. A machine for the described purpose comprising a tapered outer mold; a tapered inner mold movable into the outer mold to compress the material in the intervening mold space; a yieldable annular end-abutment closing the foot of the mold space;

and a drain rod in the axis of and carrying the inner mold, said rod having a plug extension to close the annular end-abutment.

19. A machine for the described purpose comprising a tapered outer mold; an annular spring controlled sliding abutment closing the foot of the mold space; a tapered inner mold movable into the outer mold to compress the material, said inner mold being composed of a circumferential series of swinging fingers; a tubular drain rod in the axis of said inner mold, said rod having a plug extension adapted to close the annular abutment; and a pivotal connection between said rod and fingers.

20. A machine for the described purpose comprising a tapered outer mold; an annular spring controlled sliding abutment closing the foot of the mold space; a tapered inner mold movable into the outer mold to compress the material, said inner mold being composed of a circumferential series of swinging fingers; a tubular drain rod in the axis of said inner mold, said rod having a plug extension adapted to close the annular abutment; a pivotal connection between said rod and fingers; and means for holding said fingers together in taper-mold shape.

21. A machine for the described purpose comprising a tapered outer mold; an annular spring controlled sliding abutment closing the foot of the mold space; a tapered inner mold movable into the outer mold to compress the material, said inner mold being composed of a circumferential series of swinging fingers; a tubular drain rod in the axis of said inner mold, said rod having a plug extension adapted to close the annular abutment; a pivotal connection between said rod and fingers; means for holding said fingers together in taper-mold shape; and means acting on said fingers to spread them apart when withdrawn from the outer mold.

22. A machine for the described purpose comprising a tapered outer mold having a cylindrical foot; an annular spring controlled sliding abutment seated in said foot and closing the mold space; a tapered inner mold movable into the outer mold for compressing function, said inner mold being composed of a circumferential series of swinging fingers, said fingers having a straight portion forming a shouldered cylindrical head for the inner mold; a tubular drain rod in the axis of said inner mold and to which the fingers are pivotally connected, said rod having a plug extension adapted to close the annular abutment; a spring encircling said fingers to hold them together in taper-mold shape; and a cylindrical extension of the outer mold coacting with the shouldered cylindrical head of the inner mold to exert pressure on top of the material.

23. A machine for the described purpose comprising a tapered outer mold having a cylindrical foot; an annular spring controlled sliding abutment seated in said foot and closing the mold space; said abutment having a rabbet around the outer edge of its inner face; a tapered inner mold movable into the outer mold for compressing function, said inner mold being composed of a circumferential series of swinging fingers, said fingers having a straight portion forming a shouldered cylindrical head for the inner mold; a tubular drain rod in the axis of said inner mold and to which the fingers are pivotally connected, said rod having a plug extension adapted to close the annular abutment; a spring encircling said fingers to hold them together in taper-mold shape; and a cylindrical extension of the outer mold coacting with the shouldered cylindrical head of the inner mold to exert pressure on top of the material.

24. A machine for the described purpose comprising a tapered outer mold having a cylindrical foot; an annular spring controlled sliding abutment seated in said foot and closing the mold space; a tapered inner mold movable into the outer mold for compressing function, said inner mold being composed of a circumferential series of swinging fingers, said fingers having a straight portion forming a shouldered cylindrical head for the inner mold; a tubular drain rod in the axis of said inner mold and to which the fingers are pivotally connected, said rod having a plug extension adapted to close the annular abutment; a spring encircling said fingers to hold them together in taper-mold shape; a cylindrical extension of the outer mold coacting with the shouldered cylindrical head of the inner mold to exert pressure on top of the material; and means acting on said fingers to spread them apart when withdrawn from the outer mold.

In testimony whereof I have signed my name to this specification in the presence of two subscribing witnesses.

JACKSON B. YOUNG.

Witnesses:
 WM. F. BOOTH,
 D. B. RICHARDS.